July 27, 1954
W. F. BANKAUF ET AL
2,684,754
VIBRATORY CONVEYER
Filed April 20, 1949
2 Sheets-Sheet 1
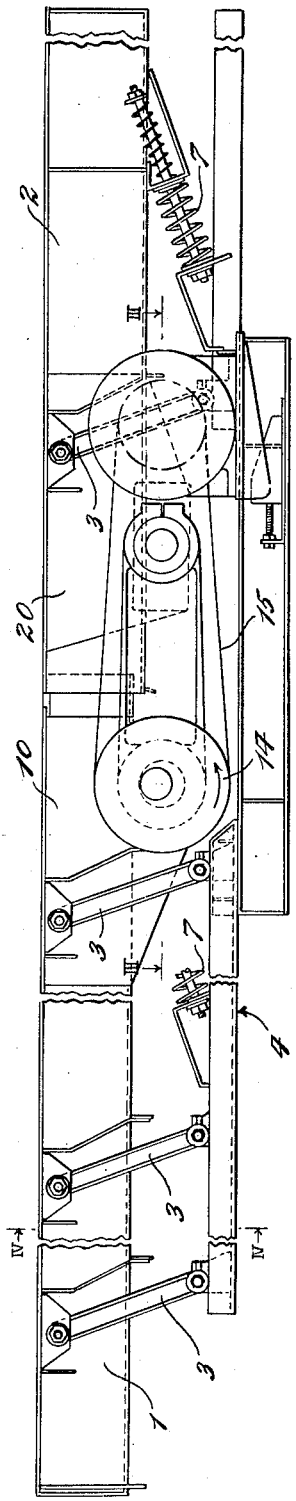
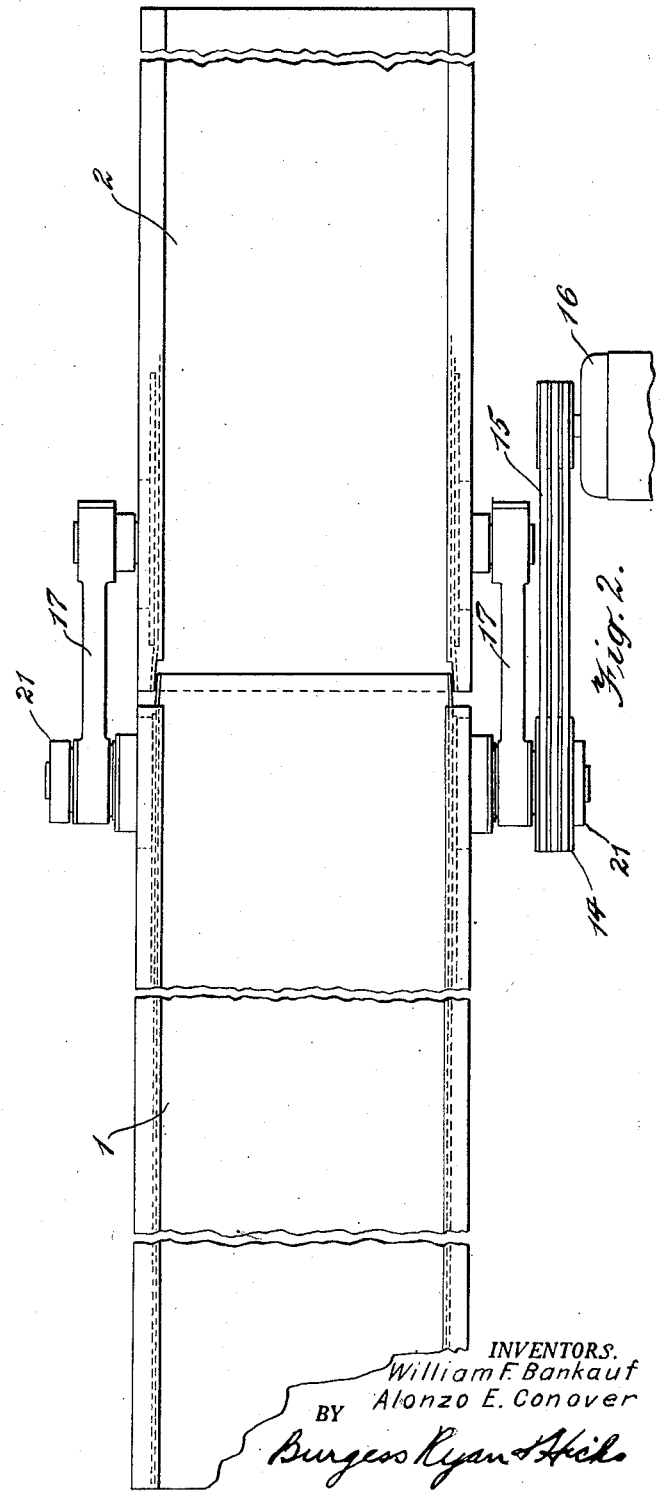
INVENTORS.
William F. Bankauf
Alonzo E. Conover
BY
Burgess Ryan & Hicks
ATTORNEYS

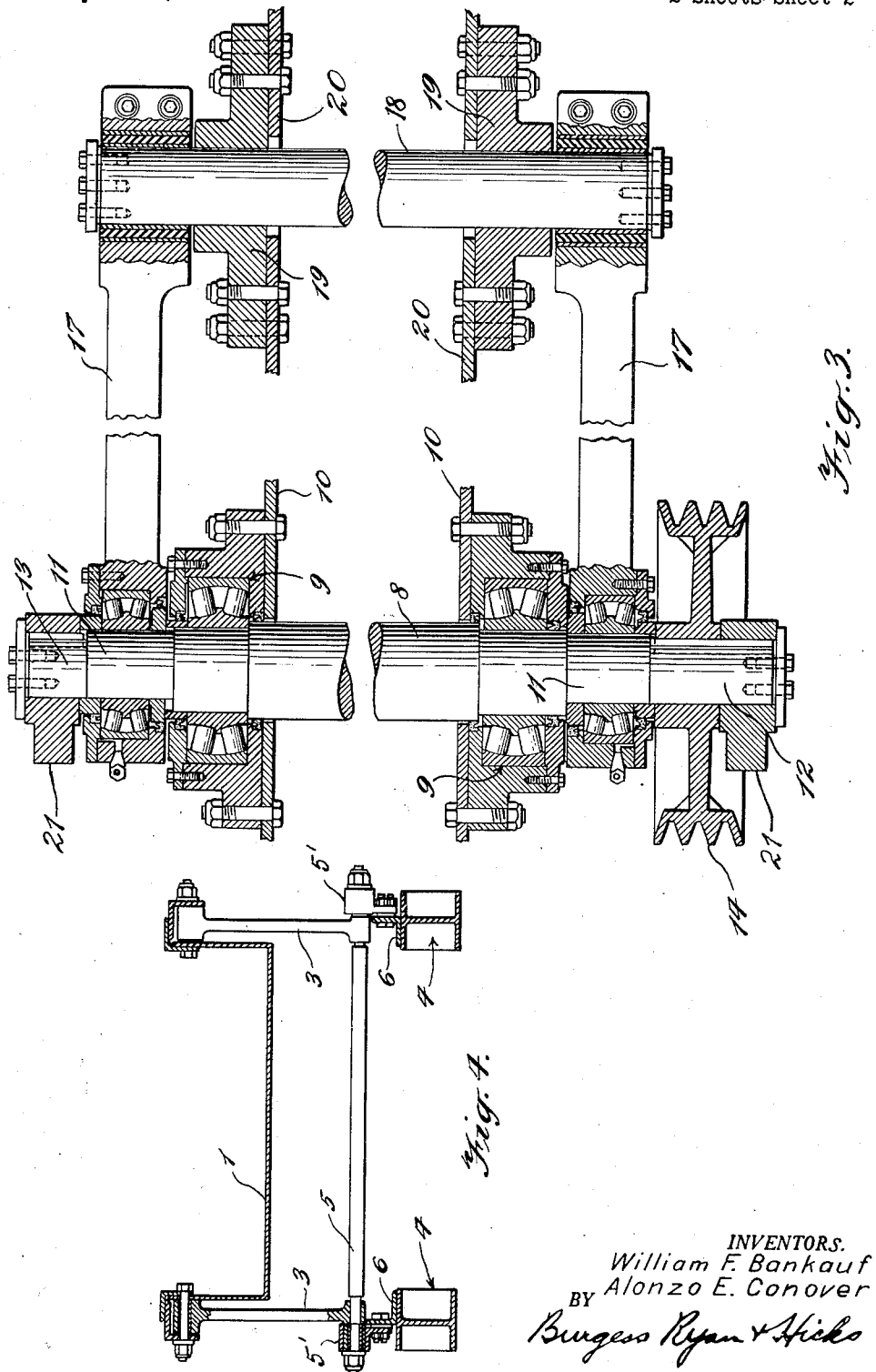

Patented July 27, 1954

2,684,754

UNITED STATES PATENT OFFICE 2,684,754

VIBRATORY CONVEYER

William F. Bankauf, East Paterson, and Alonzo E. Conover, Tenafly, N. J., assignors to Hewitt-Robins Incorporated, Buffalo, N. Y., a corporation of New York Application April 20, 1949, Serial No. 88,576

3 Claims. (Cl. 198—220)

This invention relates to conveyors of the type in which material is transported on a pan or trough extending from a supply to a discharge point and in which the material is caused to advance by the vibratory motion imparted to the trough.

As commonly constructed, such a conveyor includes what is known as a positive, eccentric type of drive, by which is meant one utilizing a fixed axis or non-floating drive shaft incorporating some form of crank or other eccentric and so coupled to the trough that the latter is compelled to go through a fixed pattern of motion as soon as and as long as the drive shaft is rotated. In other words, any point on the trough or "live" part of the conveyor is forced to move in a predetermined pattern in relation to a fixed point; and, in the result, reaction forces proportional to the loads are applied to the conveyor supports or foundations. This consideration has complicated the installation and has militated against the use of conveyors of this type, especially where materials are required to be conveyed considerable distances, as for transporting sand and castings in foundries, for example, where such distances may be of the order of 150' or more.

The primary object of the present invention is a trough-type conveyor so organized as to eliminate the positive eccentric type of drive and its attendant disadvantages. In general, this is accomplished by coupling together two trough sections in such manner, and so driving one of them, that each section serves as a counterweight for the other.

With the foregoing and other objects and advantages in view, as will presently appear, the invention comprises the features and combinations hereinafter described, with reference to the illustrative embodiment shown in the accompanying drawings.

In the drawings:

Fig. 1 is a broken-out, side elevation of the conveyor;

Fig. 2 is a broken-out, plan view;

Fig. 3 is a broken-out, enlarged scale, horizontal section on the line III—III of Fig. 1; and Fig. 4 is an enlarged scale, vertical section on the line IV—IV of Fig. 1.

The illustrated conveyor includes two trough sections 1, 2 arranged in series to provide a continuous feed path for material to be conveyed by the motion imparted to the troughs. As shown, the sections are overlapped where they meet. Both sections are mounted with freedom for relative motion, as by means of inclined, pivoted links 3, connecting the troughs to a suitable base structure, generally designated 4. As shown in Fig. 4, the links are carried by cross rods 5 supported by bearing brackets 5' and angle irons 6, the latter forming part of the base 4. Suitable springs 7 extending from the base to the trough sections serve to sustain the latter against collapsing, as will be understood. The particular details of these resilient, parallel-motion mountings form no part of the present invention and, hence, require no further description.

According to the invention, the drive mechanism for the troughs is located centrally rather than at one end, as has been the common practice heretofore, which arrangement has the advantage of leaving both the feed end and the discharge end unobstructed. As will presently appear, the trough sections may be of unequal length and hence the word "centrally" is to be understood as connoting the vicinity of the juncture of the sections, and not necessarily the center of their combined lengths.

The drive mechanism of the invention includes a floating shaft 8 having relatively eccentric portions connected respectively to the two troughs or trough sections. As shown, the shaft 8 is supported by one of the sections adjacent its junction with the other section. In the form illustrated, the shaft is journaled in bearings, generally designated 9, supported by side plates 10 rigidly secured to and depending from opposite sides of trough section 1. The shaft thus extends transversely of and beneath the trough section adjacent that end of it which overlaps trough 2. The shaft incorporates one or more cranked or eccentric portions, and preferably two such portions 11 adjacent the ends of the shaft, outside of the side limits of the trough; and beyond the eccentric portions of the shaft, at its ends, are concentric extensions, 12, 13 (that is, concentric with bearings 9). Keyed to concentric portion 12 is a drive pulley 14 which, as shown in Fig. 2, is connected by belt 15 with a motor 16 mounted on the base 4 or any other suitable foundation, independently of the trough sections. It will be apparent that the drive is not of the fixed eccentric type, in that rotation of shaft 8 by motor 16, in and of itself, imparts no vibratory motion to trough section 1.

The material-advancing motion of the troughs is effected by means of a direct connection between the eccentric part of shaft 8 and trough section 2. In this instance and as is preferred, this connection consists of links or connecting rods 17 extending from eccentric shaft portions 11 to the ends of a second shaft 18 extending transversely of and below the proximate end of trough section 2. As shown, shaft 18 is supported in mounting blocks 19 secured to side plates 20 depending from the trough section.

Thus, in response to the rotation of shaft 8, the trough sections are caused to move relatively toward and from each other a distance equal to twice the eccentricity of shaft portions 11; but the extent to which each trough section is moved is dependent upon the inertia of the other trough section. In other words, each trough section serves as a counterweight for the other trough section and the extent of movement of each section depends upon the reaction from its counterweight. In general, therefore, if the two sections are in balance, they will partake of equal motions; but it will be clear that by deliberately unbalancing them (as by making them of different lengths or otherwise weighting them unequally), the sections can be caused to partake of unequal motions and hence to effect different rates of feed of the material being conveyed.

It will be recognized that the motion of connecting rods 17 will, to some extent, give rise to unbalanced forces tending to impart vibration to the supporting structure. However, these forces can readily be offset, as by an appropriate counterweight mounted on shaft 8. For this purpose two eccentric weights 21 are shown, mounted one on each end of the shaft. It will be understood that these small weights play no material part in producing the material-advancing motion of the trough sections, and merely serve to cancel out otherwise unbalanced forces resulting from the gyration of the connecting rod mass about the axis of shaft 8.

As a result of the described type of drive and the balance achieved by making each trough section function as the counterweight for the other, both installation and maintenance are greatly simplified; and by the use of higher speeds, which are rendered perfectly feasible, the rate of movement and, hence, capacity of the conveyor, can be substantially increased. While as with conveyors generally, the speed and throw are subject to wide variation to meet the particular needs of different installations, it may be stated that the illustrated construction is designed to operate with the shaft 8 turning at 1000 R. P. M. and the eccentric shaft portions to have a ¼" stroke.

It will be apparent that, without departing from the principles of the invention, the construction may be varied widely as may be preferred, or as particular installations may require.

In the light of the foregoing, the following is claimed:

1. The combination with a conveyor including a base, two trough sections arranged in series above said base to provide a continuous feed path; inclined, pivoted links connecting the sections to the base and sustaining springs extending between the base and the sections: of a first shaft extending transversely of one of the sections at the end thereof adjacent the other section, said shaft incorporating an eccentric portion adjacent each end thereof, on the outside of the trough section, and a concentric portion at one end of the shaft beyond the eccentric portion; a drive pulley mounted on said concentric shaft portion; a second shaft extending transversely of said other section at the end thereof proximate to the first shaft; connecting rods extending from said eccentric shaft portions of the first shaft to said second shaft; eccentric weight means secured to rotate with said first shaft to counterbalance the gyrating portions of said connecting rods; and a motor having a belt connection to said drive pulley.

2. The combination with a conveyor including a base, two trough sections arranged in series above said base to provide a continuous feed path; inclined, pivoted links connecting the sections to the base and sustaining springs extending between the base and the sections: of a shaft extending transversely of one of the sections at the end thereof adjacent the other section, said shaft incorporating an eccentric portion adjacent each end thereof; a drive pulley on said shaft; connecting rods extending from said eccentric shaft portions of the shaft to said other section, eccentric weight means secured to rotate with said shaft to counterbalance the gyrating portions of said connecting rods; and a motor having a belt connection to said drive pulley.

3. The combination with a conveyor including a base, two trough sections arranged in series above said base to provide a continuous feed path; inclined, pivoted links connecting the sections to the base and sustaining springs extending between the base and the sections: of a shaft extending transversely of one of the sections at the end thereof adjacent the other section, said shaft incorporating an eccentric portion; a drive pulley on said shaft; a connecting rod extending from said eccentric shaft portion of the shaft to said other section; eccentric weight means secured to rotate with said shaft to counterbalance the gyrating portion of said connecting rod; and a motor having a drive connection to said pulley.

References Cited in the file of this patent

UNITED STATES PATENTS

| Number | Name | Date |
| --- | --- | --- |
| 1,041,507 | Norton | Oct. 15, 1912 |
| 1,214,506 | Brasack | Feb. 16, 1917 |
| 2,084,090 | Kelly | June 15, 1937 |
| 2,123,189 | Jacobsen | July 12, 1938 |
| 2,200,136 | Sloane | May 7, 1940 |
| 2,292,327 | Lincoln | Aug. 4, 1942 |

FOREIGN PATENTS

| Number | Country | Date |
| --- | --- | --- |
| 55,611 | Norway | Sept. 30, 1935 |
| 628,949 | Germany | Nov. 27, 1936 |
| 838,609 | France | Mar. 10, 1939 |